United States Patent [19]

Cornell

[11] Patent Number: 4,548,462

[45] Date of Patent: Oct. 22, 1985

[54] CABLE CLAMPING DEVICE

[75] Inventor: Paul A. Cornell, Knockanore, Ireland

[73] Assignee: Pan Electric Corporation, Carson City, Nev.

[21] Appl. No.: 569,664

[22] Filed: Jan. 10, 1984

[30] Foreign Application Priority Data

Feb. 11, 1983 [GB] United Kingdom ............... 8303790

[51] Int. Cl.⁴ .............................................. H01R 9/10
[52] U.S. Cl. .............................................. 339/266 R
[58] Field of Search ...................... 339/266, 279, 273; 24/132 R, 132 WL, 135

[56] References Cited

U.S. PATENT DOCUMENTS 3,437,979  4/1969  Beaudion ........................... 339/274

Primary Examiner—Eugene F. Desmond
Attorney, Agent, or Firm—Willian Brinks Olds Hofer Gilson & Lione Ltd.

[57] ABSTRACT

An improved cable clamping device includes a J-shaped female member which pivotably receives the head of a male clamping member. The male member defines a bore and a window extending through the tail of the member adjacent to the bore. This window is provided with a width greater than that of the bore. The female clamping member defines a raised clamping surface situated within the window when the connector is closed. This raised surface is provided with a flat, ridged contour and cooperates with the window to cause the free end of the cable to be spread laterally as the connector is closed. This lateral spreading increases pull-out resistance. Additionally, the connector is configured to ensure that two pairs of opposed clamping surfaces are provided, and that the clamping surfaces in each pair are axially spaced from one another ensuring a crimping rather than a pinching action.

8 Claims, 11 Drawing Figures

CABLE CLAMPING DEVICE

BACKGROUND OF THE INVENTION

The present invention relates to solderless electrical connectors of the type having rotatable jaws which are adapted to receive the bared end of a conductor which is securely clamped between the jaws when they are rotated to a closed position. In particular, the present invention relates to improvements to such connectors which markedly increase the pull-out resistance of the connectors.

A wide variety of such cable clamping devices are known to the prior art. The devices disclosed in my previous U.S. Pat. Nos. 3,980,381, 3,861,771, 3,831,134, and 4,357,068 are four examples of such previous connectors. Scott U.S. Pat. No. 3,973,821 discloses a fifth.

The connector disclosed in U.S. Pat. No. 4,357,068 is particularly effective as a simple, efficient connector with excellent cable pull-out resistance. However, even this connector is limited in some applications by its pull-out resistance. A need presently exists for improvements which result in further increases in pull-out resistance.

SUMMARY OF THE INVENTION

The present invention is directed to improvements to connectors such as those described above, and in particular to improvements which increase the pull-out resistance of the connector.

According to this invention, a cable connector is provided which comprises first and second clamping members mounted together for pivotal movement about an axis. These clamping members define two pairs of opposed clamping surfaces and are pivotable between an open position (in which a free end of a cable is insertable into the connector) and a closed position (in which the cable is clamped between the two pairs of clamping surfaces). The clamping surface nearest the free end of the cable is shaped to promote lateral spreading of the cable when the device is closed and is defined by the first clamping member. The second clamping member defines a window aligned with the clamping surface nearest the free end of the cable. This window is positioned adjacent to a cable-receiving opening in the second clamping member such that the cable extends through the cable-receiving opening into the window. The window has a width measured along a direction parallel to the axis greater than that of the opening such that when the device is closed the clamping surface nearest the free end of the cable spreads the free end of the cable laterally to a width greater than that of the opening, thereby increasing pull-out resistance of the connector.

In the preferred embodiment described below, the clamping surface nearest the free end of the cable defines a ridge extending parallel to the axis and oriented such that the portion of the clamping surface nearest the free end of the cable is lower than the ridge. In addition, this preferred embodiment includes a recess between the pair of clamping surfaces spaced from the free end of the cable. This recess operates to separate the two associated clamping surfaces along the axial direction in order to ensure proper crimping action.

The improvements included in the present invention provide important advantages in terms of increased pull-out resistance, increased contact area between the connector and the cable, and decreased electrical resistance between the connector and the cable. Furthermore, since the cable is spread out laterally by the action of the clamping surface nearest the free end of the cable and the window, the cable is more easily bent as the connector is closed. The ridge included on the clamping surface nearest the free end of the cable in the preferred embodiment described below provides an excellent grip on the cable in order further to increase pull-out resistance. The connector described below ensures that each pair of opposed clamping surfaces is separated along the axial direction so that the clamped cable is crimped rather than pinched or squeezed. This crimping action allows the connector of this invention to be used with cables that vary in diameter.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
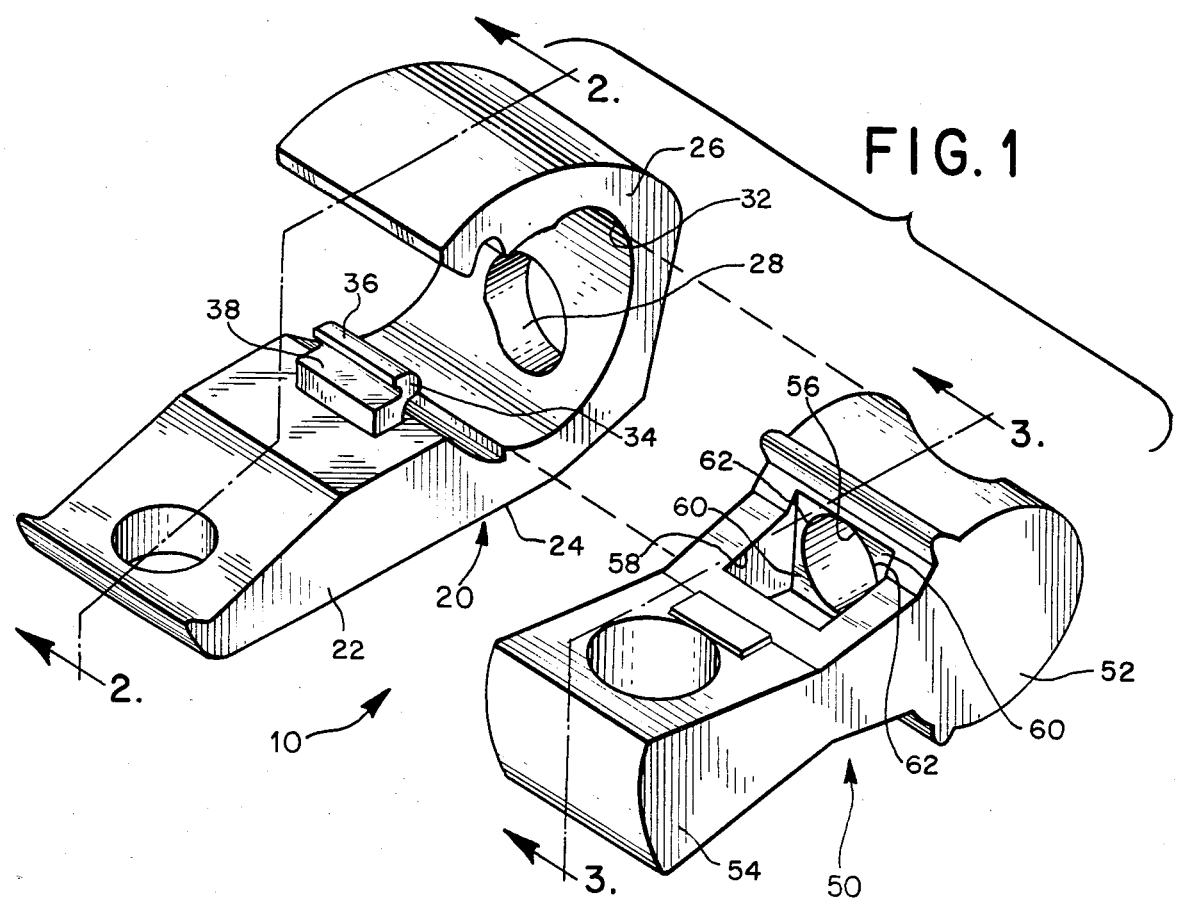
FIG. 1 is an exploded perspective view of a presently preferred embodiment of this invention.

Turning now to the drawings, FIG. 1 shows an exploded perspective view of a presently preferred embodiment of this invention. The reference numeral 10 is used to refer generally to the connector shown in FIG. 1. The connector 10 is made up of two component parts: a female member 20 and a male member 50. Both are formed from a suitable high conductance metal.

Figure 2A:
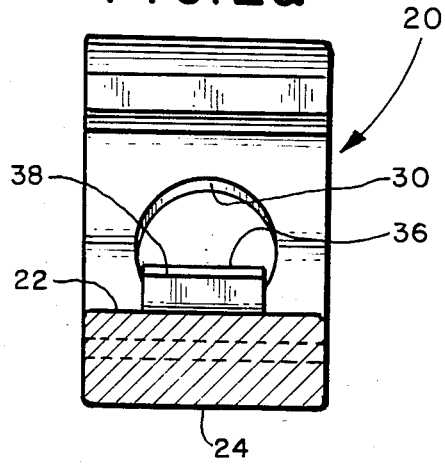
FIG. 2a is a sectional view taken along line 2a—2a of FIG. 2.
Figure 2:
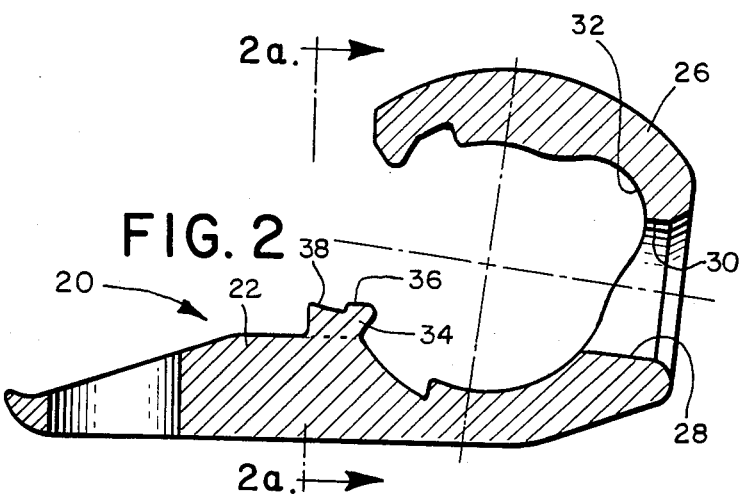
FIG. 2 is a sectional view taken along line 2—2 of FIG. 1.

The female member 20 is shown in two views in FIGS. 2 and 2a. The female member 20 is shaped rather like the letter J and includes a tail section 22 and a C-shaped bight section 26. A mounting surface 24 is defined by the tail 22 and is used to mount the connector 10 in place as described in detail below. The bight section 26 defines a central opening sized to receive the head of the male member 50. The bight section 26 also defines an opening 28 sized to receive the free end of a cable. A portion of the opening 28 serves as a clamping surface 30. The bight section 26 also defines a recess 32 adjacent to the clamping surface 30. As will be explained below, the recess 32 is used to ensure that the clamping surface 30 is axially spaced from the opposed clamping surface on the male member 50.

The tail 22 of the female member 20 defines a raised clamping surface 34 which is made up of two stepped, planar surfaces: a ridge 36 and a lower clamping surface 38. As clearly shown in FIGS. 1 and 2a, the ridge 36 and lower clamping surface 38 are planar and are oriented parallel to the axis marked at the intersection of the dot-dash lines in FIG. 2.

Figure 3A:
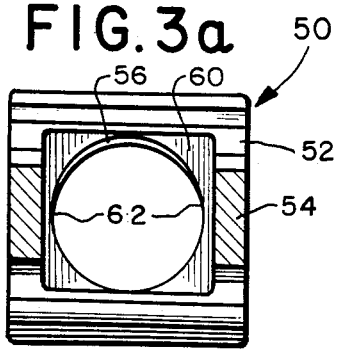
FIG. 3a is a sectional view taken along line 3a—3a of FIG. 3.
Figure 3:
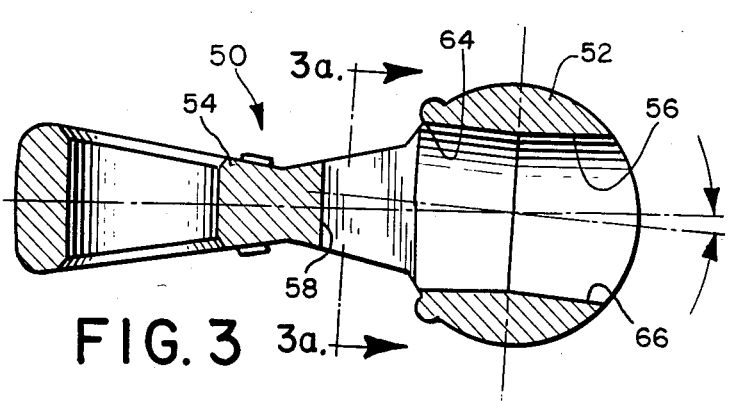
FIG. 3 is a sectional view taken along line 3—3 of FIG. 1.

The male member 50 is shown in two views in FIGS. 3 and 3a. This male member 50 includes a generally cylindrical head 52 and a radially extending tail 54. A cable-receiving bore 56 is formed in the head 52, and this bore 56 terminates in a window 58 which extends completely through the tail 54. As best shown in FIGS. 1 and 3a, the window 58 has a width measured parallel to the axis of symmetry of the head 52 which is greater than that of the bore 56. The surface of the window 58 nearest to the bore 56 is defined by a boundary surface 60. Two right-angle edges 62 are defined at the intersection between the boundary surface 60 and the bore 56. Two clamping surfaces 64,66 are defined at opposed ends of the bore 56.

It will be appreciated that in certain respects the embodiment described above is similar to the connector described in U.S. Pat. No. 4,357,068, and that patent is hereby incorporated by reference for its detailed description of the structure and operation of the connector.

However, the connector of this invention differs from that of U.S. Pat. No. 4,357,068 with regard to the shape of the raised clamping surface 34, the shape of the window 58, and the recess 32. As will be described below, these differences have been found to provide a significant increase in the pull-out resistance of the clamp of this invention as compared with the clamp illustrated in U.S. Pat. No. 4,357,068.

Figure 4:
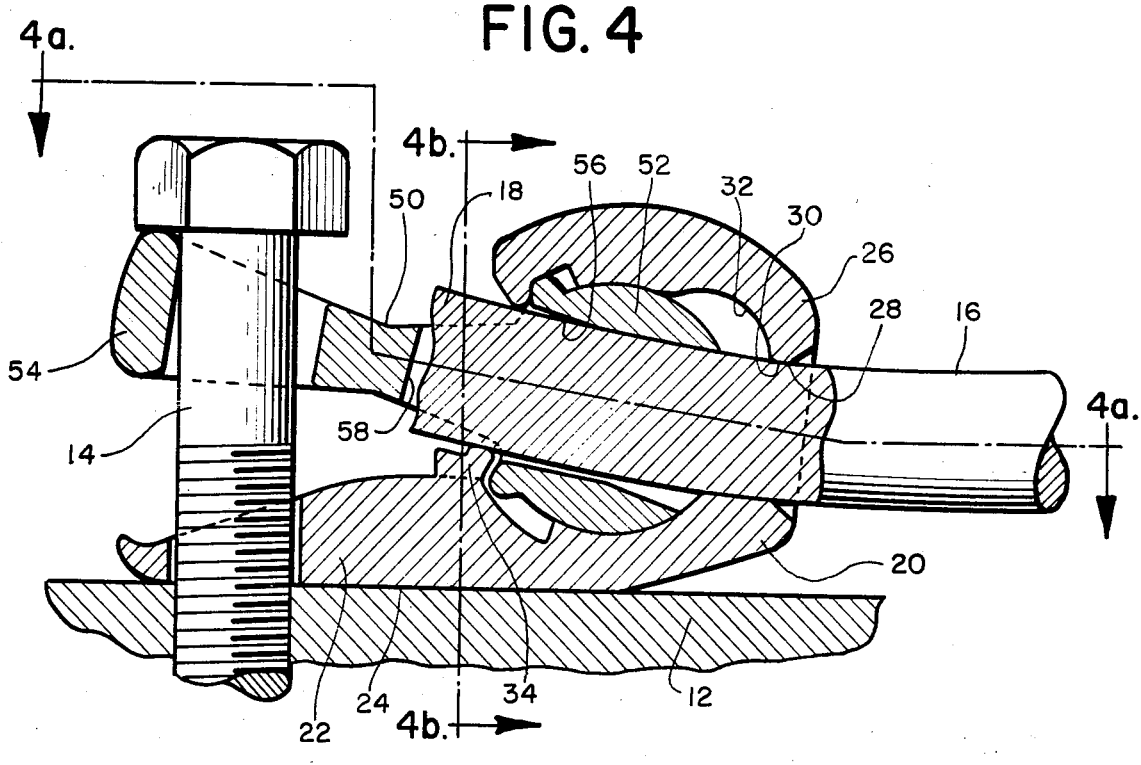
FIG. 4 is a cross-sectional view of the embodiment of FIG. 1 in which the connector is shown in an open position.
Figure 4A:
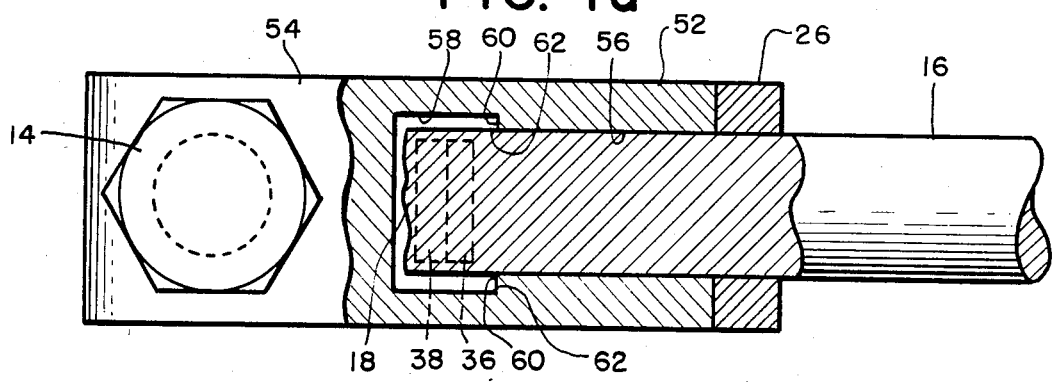
FIG. 4a is a sectional view taken along line 4a—4a of FIG. 4.
Figure 4B:
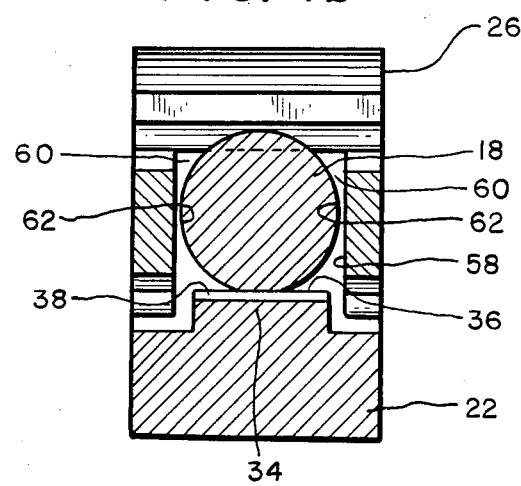
FIG. 4b is a sectional view taken along line 4b—4b of FIG. 4.
Figure 5:
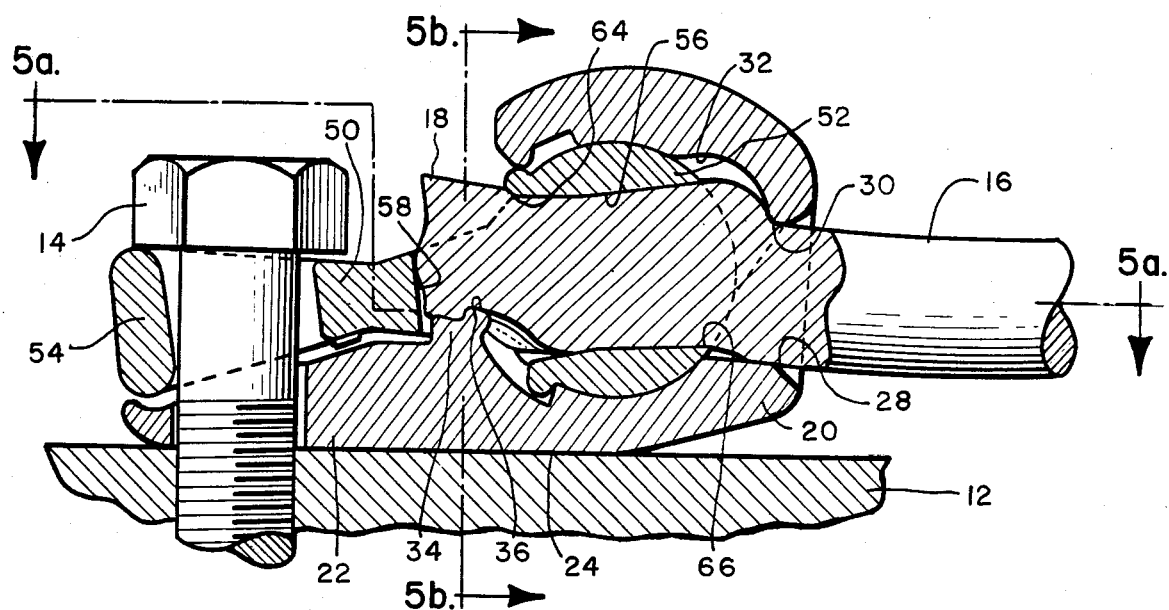
FIG. 5 is a cross-sectional view of the preferred embodiment of FIG. 1 showing the connector in a closed position.
Figure 5A:
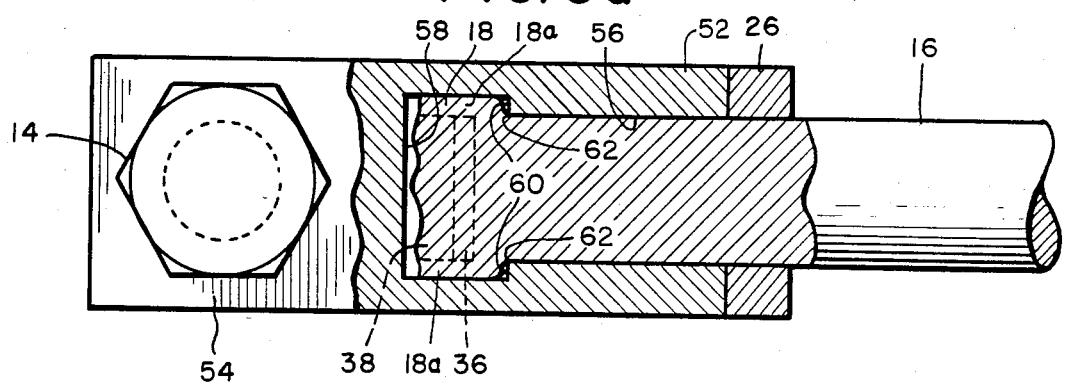
FIG. 5a is a sectional view taken along line 5a—5a of FIG. 5.
Figure 5B:
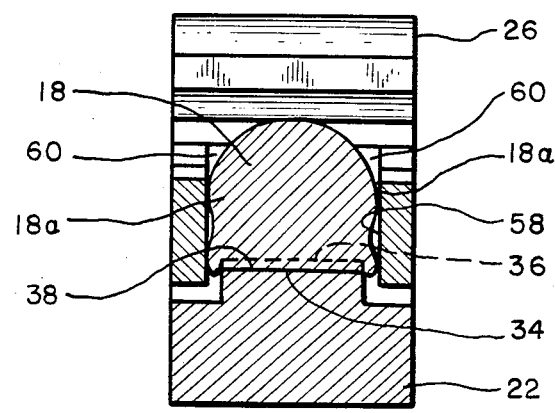
FIG. 5b is a sectional view taken along line 5b—5b of FIG. 5.

The operation of the connector of this invention will be described in detail in conjunction with FIGS. 4-4b and 5-5b. FIGS. 4-4b show the connector 10 in an open position. A bolt 14 is used to secure the connector 10 to a mounting surface 12. A cable 16, such as a multistranded copper or aluminum powder conductor, is provided with a free end 18. When the connector 10 is in the open position of FIG. 4, the free end 18 of the cable 16 can be inserted through the connector 10 into the window 58 as shown in FIGS. 4-4b. After the free end 18 of the cable 16 has been inserted into the connector 10 as shown in FIGS. 4-4b, the connector 10 is then closed by tightening the bolt 14. The fully closed connector is shown in FIGS. 5-5b.

A number of features of the connector 10 contribute to its exceptionally high pull-out resistance. First, the raised clamping surface 34 cooperates with the window 58 to spread the free end 18 of the cable 16 laterally, as shown in FIGS. 5a and 5b. In these figures the reference numeral 18a is used to denote the laterally spread end portions of the cable 16. By spreading the free end of the cable 16 laterally, the cable 16 is more easily bent upwardly by the raised clamping surface 34. Furthermore, the laterally spread portions 18a of the cable 16 interact with the edges 62 to enhance pull-out resistance. In addition, the ridge 36 protrudes into the free end 18 of the cable 16 in order further to enhance pull-out resistance. It should be noted that both the ridge 36 and the lower surface 38 are provided with a planar shape which promotes lateral spreading of the free end 18. This is in contrast to the concave raised clamping surface 44 shown in U.S. Pat. No. 4,357,068.

Another significant feature of the illustrated embodiment is that the clamping surfaces 30,66 are axially spaced along the length of the cable 16. This axial separation between the clamping surfaces 30,66 is ensured by the recess 32. Because the clamping surfaces 30,66 are axially spaced, the cable 16 is crimped rather than simply squeezed when the connector 10 is closed. For this reason the connector 10 is usable with a wider range of cable sizes. It should be noted that the ridge 36 is also axially spaced from the clamping surface 64 in order to provide a crimping rather than squeezing action at the free end of the cable 18 as well.

Laboratory tests have shown that the embodiment described above provides a significant increase in pull-out resistance as compared with the clamp described in U.S. Pat. No. 4,357,068. In addition, the lateral spreading of the free end of the cable 16 provides greater contact area between the connector and the cable and a concomitant reduction in electrical resistance between the connector and the cable.

Of course, it should be understood that a wide range of changes and modifications to the preferred embodiment described above will be apparent to those skilled in the art. For example, the improvements described above can be utilized with connectors which utilize a fixed male member and a pivoting female member, and this invention is well suited for use in connectors that do not include reversible parts of the type described in U.S. Pat. No. 4,357,068. It is therefore intended that the foregoing detailed description be regarded as illustrative rather than limiting, and that it be understood that it is the following claims, including all equivalents, which are intended to define the scope of this invention.

I claim:

1. A device for clamping a cable comprising:
   first and second clamping members mounted together for pivotal movement about an axis, said clamping members defining two pairs of opposed clamping surfaces and pivotable between an open position, in which a free end of a cable is insertable into the device, and a closed position, in which the cable is clamped between the two pairs of clamping surfaces;
   the one of the clamping surfaces nearest the free end of the cable being disposed on the first clamping member and shaped to promote lateral spreading of the cable when the device is closed;
   the second clamping member defining a window aligned with said one of the clamping surfaces and a cable receiving opening adjacent to the window such that the cable extends through the cable-receiving opening into the window;
   the window having a width measured along a direction parallel to the axis greater than that of the opening such that said one of the clamping surfaces operates, when the device is closed, to spread the free end of the cable laterally to a width greater than that of the opening, thereby increasing pull-out resistance of the device.

2. The invention of claim 1 wherein said one of the clamping surfaces defines a ridge extending parallel to the axis and oriented such that the portion of said one of the clamping surfaces nearest the free end of the cable is lower than the ridge.

3. The invention of claim 1 wherein the first clamping member is hook-shaped and defines a C-shaped bight section; wherein the second clamping member defines a tail and a cylindrical head sized to fit within the bight section; and wherein the window is defined in the tail.

4. The invention of claim 1 wherein the window defines a boundary surface parallel to the axis; wherein the opening passes through the boundary surface; and wherein portions of the boundary surface extend laterally on either side of the opening.

5. A device for clamping a cable comprising:
a female member including a tail portion adapted for mounting on a supporting structure and an open, generally cylindrical head portions;
a male member including a tail portion and a generally cylindrical head portion adapted to fit within the female head portion for rotation therein about an axis;
said tail portions being spaced apart when said device is in its open, cable-receiving position and in close proximity when said device is in its closed, cable-clamping position;
said female head portion having a cable-receiving opening and said male head portion having a cable-receiving bore, said opening and bore being in general axial alignment when said device is open and in axial misalignment when said device is closed;
said device having a first pair of opposed cable clamping surfaces comprising an interior surface portion of said female opening and an interior surface portion of one end of said male bore; and
said device having a second pair of opposed cable-clamping surfaces comprising an interior surface portion of the other end of said male bore and a clamping surface on said female tail;
said male tail defining a window extending completely through the male tail and aligned with the clamping surface on the female tail, said window having a width, measured parallel to the axis, which is greater than the diameter of the bore such that at least one lateral edge is defined between the bore and the window;
said clamping surface on the female tail comprising at least one plane parallel to the axis;
said second clamping surfaces effective to spread a cable laterally into the window when the device is closed such that the at least one edge effectively resists pull-out of the clamped cable.

6. The invention of claim 5 wherein the clamping surface on the female tail comprises:
an upper planar clamping surface oriented parallel to the axis; and
a lower planar clamping surface oriented parallel to the axis and spaced farther from the male head than the upper planar clamping surface;
said upper planar clamping surface extending farther into the window than the lower planar clamping surface when the device is closed.

7. The invention of claim 5 wherein the female member defines a recess situated between the interior surface portion of the female opening and the male head in order to promote crimping of the cable.

8. A cable clamping device comprising:
a male member comprising a generally cylindrical head and a radially extending tail, said head defining a longitudinal cylinder axis and a cable-receiving bore which extends through the head into the tail, said tail defining a window extending completely through the tail adjacent to the head and in communication with the bore, said window having a width measured along a direction parallel to the longitudinal cylinder axis greater than the width of the bore, said window defining a planar boundary surface extending parallel to the longitudinal cylinder axis, said bore passing through a central portion of the boundary surface such that the boundary surface extends laterally on both sides of the bore;
a generally J-shaped female member which defines a tail and a bight section, said bight section defining a generally cylindrical head sized to receive the male head, said bight section defining a cable-receiving opening, said female tail defining a raised clamping surface, said male member being pivotable in the female member between an open position, in which the bore and the opening are in general axial alignment, and a closed position, in which the bore and opening are axially misaligned;
said raised clamping surface positioned to fit within the window when the device is closed and comprising an assembly of stepped surfaces extending parallel to the axis and defining a ridge which extends parallel to the axis adjacent to the bight section;
said male and female members cooperating to define first and second pairs of opposed clamping surfaces arranged to crimp rather than pinch a cable when the device is closed, said first pair comprising the raised clamping surface and a portion of one end of the bore, said second pair comprising a portion of the other end of the bore and a portion of the bight section adjacent to the opening;
said bight section defining a recess between the portion of the bight section adjacent to the opening and the male head to ensure axial separation between the second pair of clamping surfaces;
said raised clamping surface effective to spread the width of a cable into lateral portions of the window when the device is closed in order to increase pull-out resistance of the clamped cable.

* * * * *